Patented Nov. 6, 1934

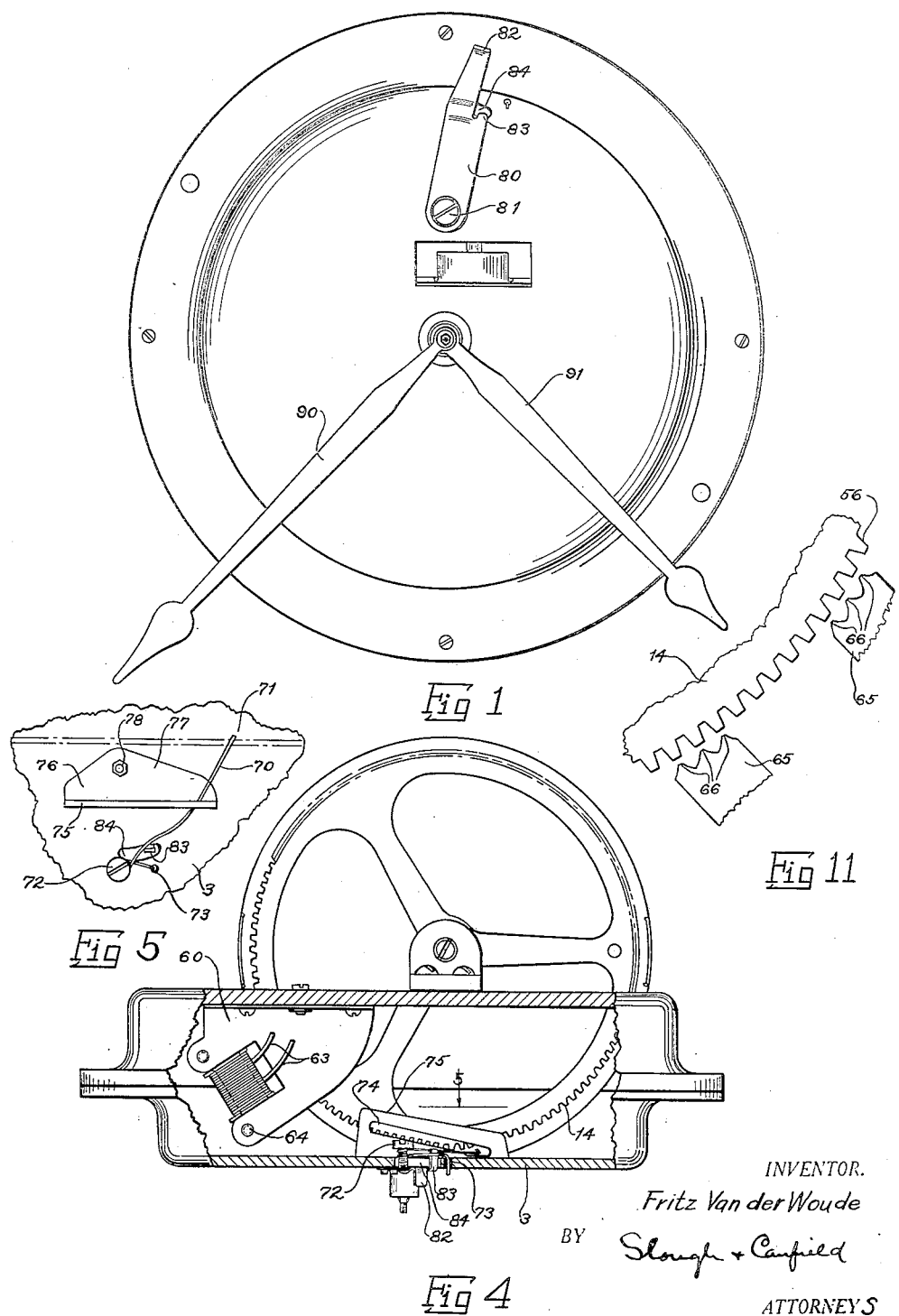

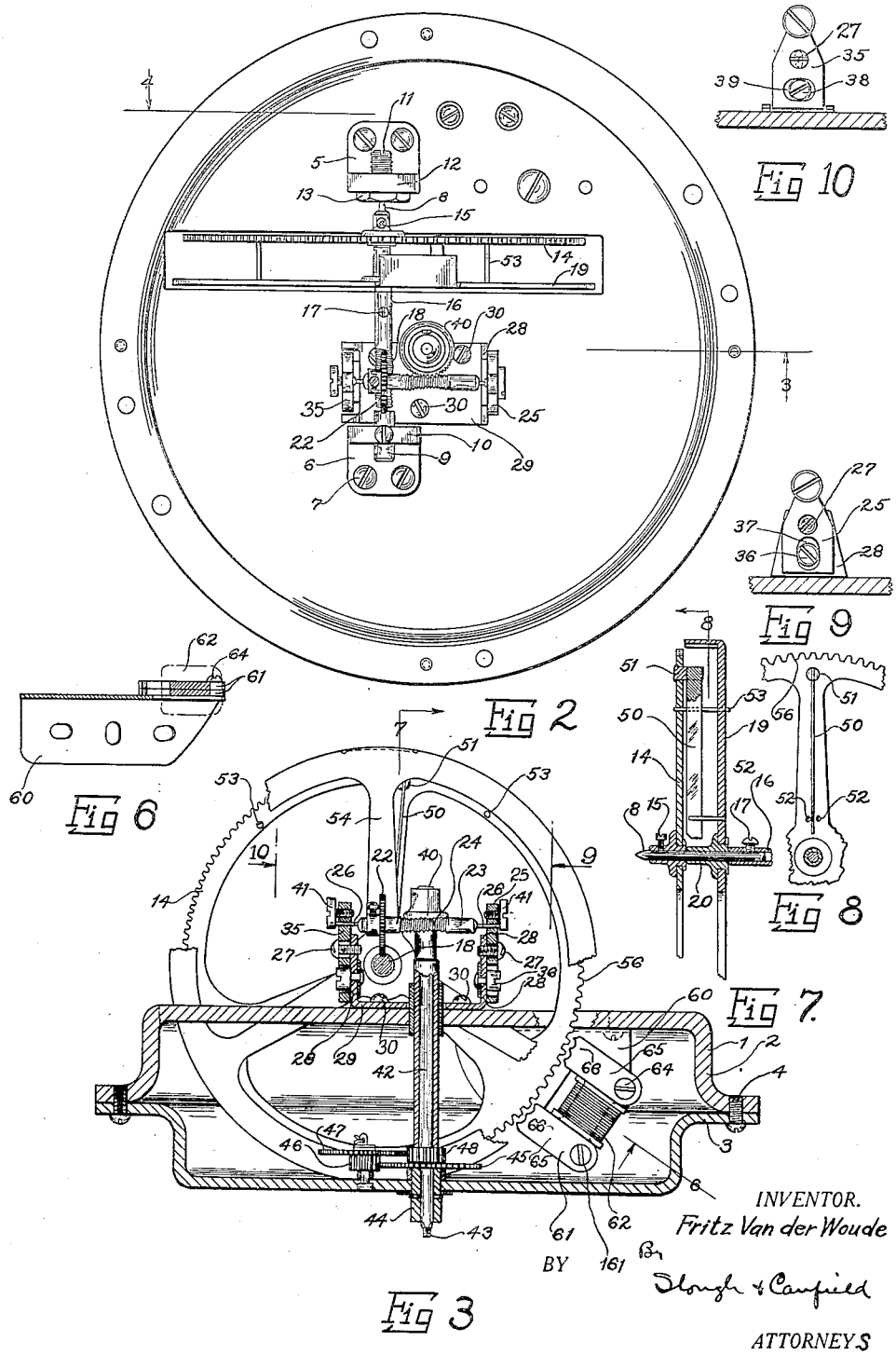

1,979,357

UNITED STATES PATENT OFFICE 1,979,357

ELECTRIC MOTOR MECHANISM

Fritz van der Woude, Elyria, Ohio, assignor to The General Industries Company, Elyria, Ohio, a corporation of Ohio Application August 12, 1931, Serial No. 556,525

8 Claims. (Cl. 172—275)

This invention relates to mechanisms for measuring and indicating the passage of time and particularly to mechanisms of this class actuated by alternating electric current.

The generation of alternating electric current at central stations for general distribution to consumers has been developed to the point where the rate of the alternations is very precise with respect to time, particularly over a relatively great length of time.

It has accordingly become the practice to utilize the exactly timed alternations of current in the distributing system at points of consumption to actuate electric clocks, and other timing mechanisms.

Such clocks as heretofore proposed have generally employed electric motors of the synchronous type, the motors rotating in synchronism with the alternations of current and thus rotating at a predetermined fixed time rate.

Such motors, however, as heretofore proposed have had the disadvantage of high speed, being generally of bi-polar type and therefore, because the usual frequency of the distributed alternating current is 60 cycles per second, revolving at the rate of 3600 revolutions per minute. Consequently, a great reduction of speed by means of gearing and the like is necessary between the motor and the time-indicating element. Such mechanisms, therefore, have the objection of relatively rapid deterioration due to the high speed of the motor and of complications due to the great speed reduction.

Furthermore, it has been found that motors which can be cheaply constructed and which will automatically maintain synchronism with the alternating current must be of small size and therefore capable of developing only small power.

It is therefore one of the objects of this invention to provide an electric motor which will rotate in synchronism with the alternations of current but at a relatively low speed.

Another object is to provide a simple and cheap electric motor which will rotate in synchronism with the alternations of alternating electric current supplied thereto, and which may be constructed to rotate at any desired low speed within reasonable limits, the rate of revolution per minute being only a fraction of the rate of alternations of current per minute.

Another object is to provide an improved mechanism for starting a non-self-starting synchronous motor.

Another object is to provide a clock mechanism, or time-measuring and indicating mechanism etc. actuated by alternating electric current and provided with a driving motor, the rotor of which is adapted to rotate in synchronism with the alternations of the current but at a revolutionary rate which is only a fraction of the rate of alternations of the current.

Other objects will be apparent to those skilled in the art to which my invention appertains.

My invention is fully disclosed in the following description taken in connection with the accompanying drawings, in which:—

Fig. 1 is a front elevational view of an embodiment of my invention which is generally in the form of a clock and employing the usual clock hands as the time-indicating elements thereof;

Fig. 2 is a rear elevational view of the embodiment of Fig. 1;

Fig. 3 is a sectional view taken approximately from the plane 3 of Fig. 2;

Fig. 4 is a sectional view taken approximately from the plane 4 of Fig. 2;

Fig. 5 is a fragmentary view taken approximately from the plane 5 of Fig. 4;

Fig. 6 is a fragmentary sectional view taken approximately from the plane 6 of Fig. 3;

Fig. 7 is a fragmentary sectional view taken from the plane 7 of Fig. 3;

Fig. 8 is a partial sectional view taken approximately from the plane 8 of Fig. 7;

Fig. 9 is a fragmentary view taken approximately from the plane 9 of Fig. 3;

Fig. 10 is a fragmentary view taken approximately from the plane 10 of Fig. 3;

Fig. 11 is an enlarged fragmentary view of the rotor and stator teeth shown in Fig. 3.

Referring to the drawings, I have shown generally at 1 a main support or housing composed of a pair of dish-shape portions 2 and 3, preferably formed from sheet metal, and joined together by their flanges as at 4 by screws or the like.

Upon the housing portion 1 and externally thereof, is a pair of spaced brackets 5 and 6 secured in position by screws as at 7. A shaft 8 is rotatably supported by pivot bearings at its opposite ends by the brackets 5 and 6. These bearing supports are preferably of the jewel type, the jewel at one end being mounted in a holder 9 telescopically adjustable in a vertical leg 10 of the bracket 6, and the jewel at the other end being supported in the end of an adjusting screw 11 threaded into a vertical leg 12 of the bracket 5 and provided with a lock nut 13.

Rigidly mounted on the shaft 8 is a toothed wheel 14 secured to the shaft by a set screw 15 projected through a hub of the wheel and engaging the shaft 8 as shown in Fig. 7.

A sleeve 16 telescoped on the shaft 8 is locked thereto by a set screw 17 and has formed thereon a worm gear thread 18. A fly-wheel 19 has a hub 20 rotatably mounted on the shaft 8 and held against axial movement by engagement of the hub at one end with the toothed wheel and at the other end with the adjacent end of the sleeve 16.

The worm 18 is meshed with a worm gear 22 mounted on a shaft 23 provided with a worm thread 24 and mounted at its ends in bearing plates 25 and 35, the ends of the shaft 23 being of pin-form of reduced diameter as shown at 26 and rotating in suitable bearing bores in the plates 25 and 35.

The plates 25 and 35 are supported on vertical legs 28—28 of a U-shaped bracket 29 secured upon the housing portion 1 as by screws 30. The plate 25 is adjustably rotatable around a screw 27 by which it is secured to the leg 28, and the plate 35 is vertically adjustable upon its screw 27 by which it is attached to the corresponding leg 28 of the bracket 29. This adjustment is shown in Figs. 3, 9 and 10. As shown in Fig. 9, the plate 25 may be oscillated around the screw 27 by turning an eccentric cam 36 in a cam slot 37 and, as shown in Fig. 10, the plate 35 may be adjusted vertically by turning a similar cam 38 in a cam slot 39 to adjustably raise and lower the plate 35. The plate 35 may have an elongated hole for the screw 27 and the screw may be tightened upon the plate 35 after the adjustment is made.

By this means, the shaft 23 may be raised and lowered to suitably adjust the worm wheel 22 to the worm 18, and the shaft 23 may be adjusted in the direction parallel to the worm 18 to correspondingly adjust it with respect to a worm wheel 40 which is meshed with the worm 24.

The endwise position of the shaft 23 may be adjusted by screws 41—41 engaging on the under sides of their head the ends of the extensions 26—26 and which screws 41 are threaded into the plates 25 and 35 as plainly shown in Fig. 3.

The worm gear 40 referred to is mounted on the upper end, as viewed in Fig. 3, of a shaft 42 rotatably mounted in suitable bearings in the housing portions 2 and 3 and projecting from the housing portion 3 as shown at 43. A sleeve 44, rotatable on the shaft 42, is adapted to be driven at reduced speed by rotation of the shaft 42 through reduction gears 45, 46, 47 and 48, the gear 45 being connected to the sleeve 44 and the gear 48 to the shaft 42.

As will be understood hereinafter, clock hands may be secured to the sleeve 44 and the shaft 43 and the speed reduction between the shaft 43 and the sleeve 44 is therefore preferably in the ratio of 1 to 12.

The fly-wheel 19 is resiliently connected with the toothed wheel 14 by a flat spring 50 rigidly connected to the toothed wheel 14 as at 51 at a point thereon relatively remote from the axis, and the spring 50 extends inwardly radially to a point adjacent the axis where it is interposed between a pair of pins 52—52 extending axially from the fly-wheel 19. Thus movement of the toothed wheel 14 is communicated resiliently to the fly-wheel 19. The possible movement of the fly-wheel 19 with respect to the toothed wheel 14 is limited by a pair of pins 53—53 mounted on and secured to the toothed wheel 14 at spaced points remote from the axis thereof and projecting axially toward the fly-wheel 19 and preferably extending into open spaces between suitable spokes 54 of the fly-wheel. Thus upon relative movement of the fly-wheel, the spokes 54 will engage one or the other of the pins 53 in either direction of relative rotation.

The teeth 56 of the toothed wheel may be of any suitable profile shape and may be of the shape of gear teeth; and the number and size of the teeth may be proportioned to the parts with which they cooperate to be described later, and I find that for a toothed wheel 14 of 3⅜" outside diameter, a suitable number of teeth is one-hundred twenty.

Secured to the inner side of the housing portion 2 is a bracket 60 upon which is mounted an alternating current electro-magnet 161 comprising U-shaped laminations 61—61 and a winding 62 on the yoke portion of the U. Terminals 63 of the winding 62 may be carried out to insulated binding posts on the housing portion 2 not shown.

The electro-magnet thus formed may be secured to the bracket 60 by screws 64 projected through the laminations 61 and threaded into the bracket 60.

The legs of the U, or in other words, the pole pieces 65—65 of the magnet, terminate in teeth 66—66 disposed generally in a circular arc. The electro-magnet is so positioned that the teeth 66 thereof will confront the teeth 56 of the toothed wheel 14 with a slight clearance space therebetween. The teeth 66 are preferably spaced apart substantially the same as the teeth 56. Thus in one relative position of the wheel and magnet, there will be a tooth of the wheel opposite each tooth of each pole piece 65 of the magnet, as clearly shown in Fig. 11, wherein the conditions of Fig. 3 are reproduced to a larger scale.

By a mode of operation to be more fully described, the toothed wheel 14 when once set in motion will be continued in rotary motion by the action thereon of the electro-magnet 161. To set the wheel 14 initially in motion I provide the following means. Upon the inside of the cover portion 3 and as most clearly shown in Fig. 5, I provide a wire spring 70 having a free end 71 and, in an intermediate portion, wound around a stationary screw 72, the other end being anchored in a perforation 73 in the housing portion 3. The free end 71 of the spring 70 tends, by its own resilience, to rotate clockwise around the screw 72 as viewed in Fig. 5, and is stopped by lodging in one end of a slot 74 in a leg 75 of an angle bracket 76, the leg 77 of the bracket being secured to the inner surface of the housing portion 3 by a screw or bolt 78.

The slot 74 slopes upwardly toward the other end of the leg 75 as plainly shown in Fig. 4. The free end 71 of the spring 70, and the slot 74, are so formed and disposed that the end 71 is adjacent but slightly spaced from the toothed periphery of the toothed wheel 14; and so that when the free end 71 of the spring 70 is moved in a manner to be described toward the other end of the slot 74, the incline of the slot will cause the end of the spring to rise or move toward the toothed wheel and enter a tooth thereof and follow said tooth, rotating the wheel 14 through a small angle and until the end of the spring is lodged in the other end of the slot 74. Upon releasing the spring 70, it will resiliently snap back to its original position and be withdrawn from the teeth of the wheel, thus giving a resilient kick or rotative impulse to the wheel, the direction of which is counter-clockwise as viewed in Fig. 4 and clockwise as viewed in Fig. 3.

To retract the spring 70 for the purpose just described, the lever 80 is provided, Fig. 1, disposed on the outside of the housing portion 3, pivoted thereto as at 81, having a handle 82 and provided with a lug 83 extending into the housing portion 3 through a perforation 84 therein.

The screw 78 and the screw 81 may conveniently be the same screw or bolt, thus upon moving the lever 80 around the screw 78 by means of the handle 82, the lug 83, Fig. 5, describes an arcuate movement around the bolt 78 and winds up the spring 70. Upon releasing the handle 82, the spring 70 retracts to give the above described impulse to the wheel 14 and incidentally returns the lever 80 to its original position, that being the position illustrated.

In the operation of my invention, the winding 62 of the electro-magnet being first energized, from a source of alternating current, such for example, as the ordinary house lighting circuit at 60 cycles per second, the operator moves the lever 80 as above described to move the spring 70 to the other end of the slot 74, thus engaging it with the teeth of the wheel 14 and then releases it whereupon the spring 70 gives kick or rotative impulse to the toothed wheel, setting it in rotary motion. The teeth 56 of the wheel thus are caused to approach and pass by the teeth 66 of the electro-magnet. The initial rotative velocity of the wheel is greater than the velocity at which it will ultimately continue to run. As the wheel therefore slows down, it reaches the speed at which the successive teeth of the wheel approach the magnet teeth at the rate of sixty teeth per second, and there being in the case under consideration one-hundred twenty teeth, this is obviously at the rotational rate of one revolution every two seconds. Any tendency of the wheel to fall below this speed must take place against the pull of magnetism emanating from the magnet teeth 66 and entering the teeth 56 of the wheel. Each tooth 56 of the wheel approaches a tooth 66 of the magnet during the interval in which the magnetism is of substantial value, and therefore the wheel teeth are pulled upon by the magnetism to give a rotative impulse to the wheel, and each tooth of the wheel passes from one tooth of the magnet to the next during the interval that the magnetism is at relatively small or zero value. Thus the wheel is maintained continuously in operation by the impulses of magnetism existing between the teeth 66 and the teeth 56.

This action is rendered more positive by the concurrent action of the fly-wheel 19. Each impulse given to the teeth 56 to rotate the wheel 14 causes the wheel 14 to tend to move relatively to the fly-wheel 19 and thus puts tension in the spring 50, applying rotative force to the fly-wheel 19. Any tendency of the wheel 14 to slow down or stop between impulses is then overcome by the reaction of the fly-wheel 19 which, rotating with an increase of speed due to the energy put into it by the spring 50 overtakes the wheel 14 and gives back to it the impulse of energy which it had received.

Thus the toothed wheel 14 is caused to rotate continuously in synchronism with the alternations of energy in the alternating current circuit by which it is energized.

As will be understood from the foregoing description, the particular embodiment by which I have chosen to illustrate my invention is in the nature of a clock, the rotary movement of the wheel 14 being geared down by two worm and worm wheel gear sets to drive the minute hand of a clock such as the hand 90 secured to the shaft 43 and the hour hand, such as the hand 91, secured to the sleeve 44. An electric synchronous clock of very simple design is thus provided inasmuch as the wheel 14 even in such small size as that illustrated which, as above stated, is approximately 3⅜" in diameter, rotates at a relatively low speed and very little gear reduction is necessary. The application of my invention to drive clocks is therefore one of the most important applications. However, as will be clearly understood, my invention is not limited to clock mechanisms, but is applicable to any mechanism which it is desired to drive at a speed synchronous with a supply of alternating current or, at a constant speed in those cases in which the alternating current itself is regulated at the central station to substantially a constant frequency.

Many modifications and changes may be made within the scope and spirit of my invention without sacrificing its advantages.

I claim:

1. An electric synchronous motor comprising a rotary element provided with an annular series of teeth of magnetic material, an electro-magnet adapted to be energized with alternating current and having a pole portion provided with a tooth disposed adjacent the rotational path of the teeth of the rotary element to cause the teeth of the rotary element to successively approach and pass the tooth of the magnet, a rotary auxiliary relatively oscillatory element, the two rotary elements being substantially coaxially disposed, a driving connection between the two rotary elements, the connection comprising a generally radially disposed transversely bendable resilient element rigidly connected to the rotary element at a point relatively remote from the axis and loosely disposed between spaced abutments on the auxiliary element positioned relatively near the axis thereof, the inner end of the resilient element being movable radially outwardly between the abutments and means limiting said outward movement.

2. An electric synchronous motor comprising a rotary element provided with an annular series of teeth of magnetic material, an electro-magnet adapted to be energized with alternating current and having a pole portion provided with a tooth disposed adjacent the rotational path of the teeth of the rotary element to cause the teeth of the rotary element to successively approach and pass the tooth of the magnet, a rotary auxiliary relatively oscillatory element, the two rotary elements being substantially coaxially disposed, a driving connection between the two rotary elements, the connection comprising a generally radially disposed transversely bendable resilient sheet metal torque member rigidly connected to the rotary element at a point relatively remote from the axis and loosely disposed between spaced abutments on the auxiliary element positioned relatively near the axis thereof, the inner end of the resilient element being movable radially outwardly between the abutments and positive connection means engageable upon a predetermined movement of the resilient element.

3. In combination an electric motor mechanism including a housing and a relatively large toothed rotor element supported by said housing, electromagnetic means including pole pieces disposed at one side of the rotary element having toothed portions spaced substantially equal to the spacing of the rotor teeth, a movable spring pressed resilient finger positioned within said housing, a member associated with the housing and having a slot therein disposed substantially in the direction of a chord of the toothed rotor element, the resilient finger projecting through said slot and being guided thereby, and a member movably mounted adjacent said resilient finger and engageable therewith to move the finger along the guide to engage it with a tooth on the rotor element.

4. In combination with a synchronous motor mechanism comprising a housing, and a toothed rotor element, a projecting portion associated with the toothed rotor element and rotatable therewith, the housing having an aperture through which the projecting portion is periodically visible, a spring pressed finger movable substantially in the direction of a chord of the rotor element and engageable with a tooth thereof, means mounted on the frame adjacent the finger and engageable therewith to move the finger, said housing aperture and said finger engaging means being disposed on the same side of the housing.

5. In an electrical mechanism, a casing, a toothed rotor element mounted on the casing, an electro-magnet supported by the casing at one side of the rotor element, guide means extending generally tangentially of the rotor element, a resilient element in the guide means engageable with the rotor element in any rotated position thereof and between adjacent teeth and disengageable therefrom by movement along the guide means when the rotor element is rotated.

6. In an electrical mechanism, a casing, a toothed rotor element of magnetic material mounted on the casing, electro-magnetic means disposed at one side of the rotor element adapted to cooperate with the rotor element along a relatively small portion of its rotational path to effect rotation thereof, guide means supported by the casing disposed in the direction of a cord of the rotor element, a resilient element movable along the guide means engageable between adjacent teeth of the rotor element in any rotated position thereof and disengageable therefrom by movement along the guide means.

7. In an electrical mechanism, a casing, a toothed rotor element of relatively large diameter mounted on the casing, an electro-magnet disposed at one side of the rotor element adapted when energized to effect rotation of the rotor element, guide means on the casing disposed along a cord of the rotor element, a resilient element movable along the guide means engageable with the rotor element between adjacent teeth in any rotated position thereof and disengageable therefrom by movement along the guide means as the rotor element is rotated, and means for actuating the resilient element.

8. In an electrical mechanism, a casing, a toothed rotor element of relatively large diameter mounted on the casing, an electro-magnet disposed at one side of the rotor element and having toothed pole faces, the spacing of the teeth on the pole faces conforming to the spacing of the teeth of the rotor element whereby the rotor element may be caused to rotate at a predetermined substantially constant speed, guide means on the casing disposed along a cord of the rotor element, a resilient element movable along the guide means engageable with the rotor element between adjacent teeth thereof in any rotated position and disengageable therefrom by movement of the rotor element effected by the resilient element.

FRITZ van der WOUDE.